No. 818,325. PATENTED APR. 17, 1906.
G. L. WILLIAMS.
EYEGLASSES.
APPLICATION FILED APR. 18, 1904. RENEWED MAR. 6, 1905.

Witnesses:
Robert H. Weir
J. B. Weir

Inventor
George L. Williams
By L. M. Hopkins
His Attorney

UNITED STATES PATENT OFFICE.

GEORGE L. WILLIAMS, OF CHICAGO, ILLINOIS.

EYEGLASSES.

No. 818,325. Specification of Letters Patent. Patented April 17, 1906.

Application filed April 18, 1904. Renewed March 6, 1905. Serial No. 248,393.

*To all whom it may concern:*

Be it known that I, GEORGE L. WILLIAMS, a citizen of the United States, residing at Chicago, in the county of Cook and State of Illinois, have invented certain new and useful Improvements in Eyeglasses, of which the following is a specification.

The present invention relates to mountings for the lenses of eyeglasses; and its object is to prevent play or relative motion between the box, the bow-spring, and the stem of the guard in that class of eyeglasses in which the overlapping ends of the bow-spring and the stem of the guard are clamped against the bottom of the box by a retaining-screw. It has nothing whatever to do with that class of eyeglasses in which the box is of special construction and has a top and bottom between which the overlapping portions are clamped together by the action of a wedge. Such relative motion is objectionable because it tends to and eventually does loosen the retaining-screw, and this, of course, permits the lenses to wabble. To obviate these difficulties, I interpose between the overlapping ends of the bow-spring and guard, or, more particularly stated, the stem or shank thereof, a locking-plate which has portions engaging the extremities of the spring and stem, respectively, and also portions engaging the box, so that each and every one of the parts named is locked or braced the one against the other.

The invention consists in the features of novelty that are hereinafter described, with reference to the accompanying drawings, which are made a part of this specification, and in which—

Figure 1:
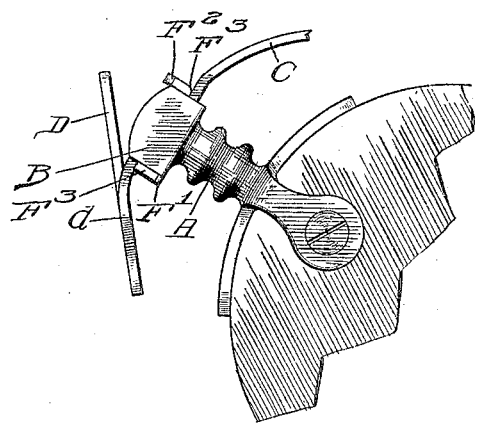
Figure 2:
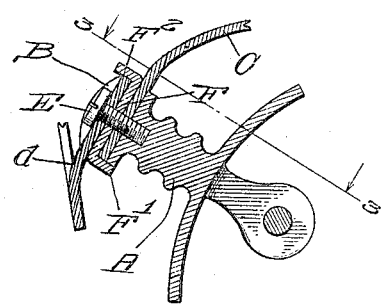
Figure 3:
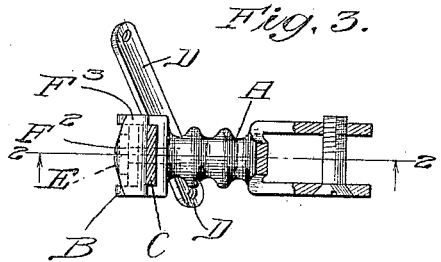
Figure 4:
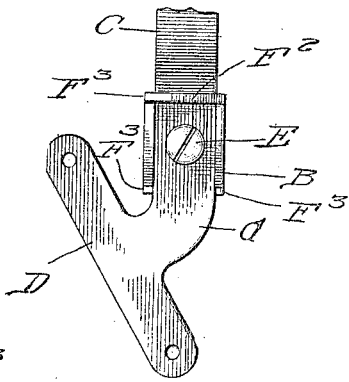
Figure 5:
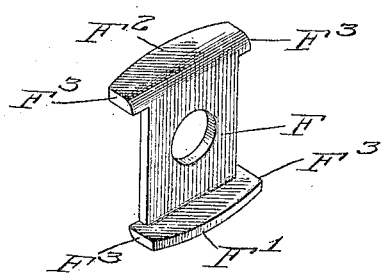

Figure 1 is a front elevation of the mounting of one lens of a pair of eyeglasses embodying the invention. Fig. 2 is a section thereof in the central plane of the lens. Fig. 3 is a plan view thereof with the bow-spring in transverse section. Fig. 4 is an elevation thereof viewed in the direction of the arrow 4, Fig. 1. Fig. 5 is a perspective view of the locking-plate.

A represents the post; B, the box; C, the bow-spring, and D the guard. The so-called "box" is of the "open" type, and by this is meant a box which has but three sides, one of which is formed by the end of the post and the other two by parallel flanges projecting from the post, so that its inner side is open, or, more correctly stated, it has no inner side at all. The ends of the bow-spring and guard, or rather the stem or shank $d$ thereof, overlap each other and occupy the box and are perforated for the passage of the retaining-screw E, which has threaded engagement with a socket in the bottom of the box in customary manner.

F represents the locking-plate, the normal shape of which both before and after the parts are assembled is clearly shown in Fig. 5. It has a central portion of equal thickness throughout which is interposed between the overlapping ends of the spring and guard and is perforated for the passage of the retaining-screw E, and its extremities are bent to provide flanges $F'$ and $F^2$, adapted to engage the extremities of the spring and guard, which latter terminate flush with the upper and lower sides of the box, respectively. Each of the flanges is provided with lateral ears $F^3$, which engage the side walls of the flanges of the box at the upper and lower sides thereof. The flanges are at right angles to the intermediate portion of the locking-plate, and all of the parts are accurately made so as to contact as above described, and as a result the parts will be firmly braced against each other, so as to prevent wabbling, even though overlapping ends of the bow-spring and guard do not fill the box from side to side, so as to make a tight fit. It is of course the intention to make a tight fit between these parts; but in actual practice there is usually a slight space, resulting either from inaccurate workmanship or from wear or from the spreading apart of the walls of the box, which gives rise to the difficulties above pointed out. I am aware that various devices for overcoming these difficulties have been proposed; but as a rule they are applicable only to special constructions, while my device is applicable to mountings having boxes of the usual or standard construction. It can be made and sold as a separate article of manufacture and applied to the many pairs of eyeglasses of standard construction which are already in existence or which may hereafter be made without necessitating any change whatever in their construction, and its application requires no special skill or special tools. This characteristic of the device which adapts it to standard articles and permits of its being readily applied thereto is of importance.

What I claim as new, and desire to secure by Letters Patent, is—

1. In a lens-mounting, the combination with an open box, a spring and a guard, the spring and guard having perforated overlapping ends occupying the box, of a locking-plate having a perforated portion of equal thickness throughout interposed between the overlapping ends of the spring and guard and having flanges engaging their respective extremities, and a screw passing through the perforations and into the box, the head of the screw having engagement with one of said overlapping portions, whereby they are clamped against the bottom of the box, substantially as described.

2. In a lens-mounting, the combination with an open box, a spring and a guard, the spring and guard having perforated overlapping ends occupying the box, of a locking-plate having a perforated portion of equal thickness throughout interposed between the overlapping ends of the spring and guard and having flanges engaging their respective extremities, and a screw passing through the perforations and into the box, the head of the screw having engagement with one of said overlapping portions substantially as described.

3. In a lens-mounting, the combination with an open box, a spring and a guard, the spring and guard having perforated overlapping ends occupying the box, of a locking-plate having a perforated portion of equal thickness throughout interposed between the overlapping ends of the spring and guard, flanges engaging their respective extremities, and laterally-extending ears engaging the side walls of the box, at both the upper and lower sides thereof, and a screw passing through the perforations into the box, substantially as described.

4. In a lens-mounting, the combination with the box, the spring and the guard, the spring and guard having overlapping ends occupying the box, of a locking-plate having a portion of equal thickness throughout interposed between the overlapping ends of the spring and guard, flanges engaging their respective extremities, and ears on the flanges engaging the side walls of the box at both the upper and lower sides thereof, substantially as described.

5. In a lens-mounting, the combination with an open box, a spring and a guard, the spring and guard having perforated overlapping ends occupying the box and terminating, at their extremities, flush with the side walls of the box at both the upper and lower sides thereof of a locking-plate having a perforated portion of equal thickness throughout interposed between the overlapping ends of the spring and guard, and flanges engaging their respective extremities and also engaging the box, and a screw passing through the perforations and into the box, substantially as described.

6. A locking-plate for lens-mountings having a perforated portion of equal thickness throughout adapted to occupy the box and to be interposed between the overlapping portions of the spring and guard, and flanges at the extremities of said perforated portion, said flanges being presented in opposite directions, substantially as described.

7. A locking-plate for lens-mountings having a perforated portion of equal thickness throughout adapted to occupy the box and to be interposed between overlapping portions of the spring and guard and flanges proceeding in opposite directions from the extremities of said perforated portion said flanges having ears adapted to engage the side walls of the box at both the upper and lower sides thereof, substantially as described.

GEORGE L. WILLIAMS.

Witnesses:
L. M. HOPKINS,
E. L. COX.